United States Patent [19]

Kobayashi

[11] Patent Number: 5,036,434
[45] Date of Patent: Jul. 30, 1991

[54] CHIP-TYPE SOLID ELECTROLYTIC CAPACITOR AND METHOD OF MANUFACTURING THE SAME

[75] Inventor: Atsushi Kobayashi, Tokyo, Japan

[73] Assignee: NEC Corporation, Japan

[21] Appl. No.: 451,173

[22] Filed: Dec. 15, 1989

[30] Foreign Application Priority Data

Dec. 15, 1988 [JP] Japan ................... 63-317961

[51] Int. Cl.⁵ ............................................ H01G 9/00
[52] U.S. Cl. .................................... 361/540; 29/25.03
[58] Field of Search ............... 361/305, 516, 523, 525, 361/526, 532, 534, 540; 428/546; 29/25.03

[56] References Cited

U.S. PATENT DOCUMENTS 4,794,491 12/1988 Saiki ...................................... 361/532

FOREIGN PATENT DOCUMENTS 62-14673 4/1987 Japan .

Primary Examiner—Donald A. Griffin
Attorney, Agent, or Firm—Leydig, Voit & Mayer

[57] ABSTRACT

A chip-type solid electrolytic capacitor comprises a capacitor element having a top surface, a bottom surface, and a side surface extending therebetween. An insulating resin layer is coated on the top and side surfaces of the element leaving the bottom surface exposed. An anode lead wire extends through the top surface from the insulating resin layer. An electroless plated layer is formed directly on the anode lead wire and the insulating resin layer at a region located on the top surface and a part of the side surface. Another electroless plated layer is also formed on the cathode layer on the bottom surface. Furthermore, solder layers are formed on the each electroless plated layers.

10 Claims, 1 Drawing Sheet

CHIP-TYPE SOLID ELECTROLYTIC CAPACITOR AND METHOD OF MANUFACTURING THE SAME

BACKGROUND OF THE INVENTION

This invention relates to a chip-type solid electrolytic capacitor and a method of manufacturing the same, and more particularly to a noble structure of an anode terminal thereof.

Japanese Utility Model Publication Sho62-14673 issued on Apr. 15, 1987 discloses a capacitor structure which uses a simplified resin coating instead of a transfer-molded resin package and which replaces conventional external metal plate terminals or metal caps with coated electrodes in order to reduce the size of the capacitor and to increase volumetric efficiency thereof. An anode coated electrode of this prior art capacitor comprises three conductive layers formed on a resin layer coated around an anode wire. More specifically, a silver paste layer, an electroless-plated layer and a solder layer are formed on the resin layer consecutively. However, since the silver paste layer is used as the undercoating of the electroless-plated layer, silver migration tends to occur in a humid environment and results in a large leakage current. Furthermore, there is a significant difference in thermal expansion coefficients between the silver paste and valve-metals such as tantalum used to form the anode lead wire and anode body. For this reason, poor contact develops between the silver paste layer and the anode lead wires due to temperature changes in manufacture and packaging processes, thereby causing poor electric connection between the plated layers and the anode lead wires. This in turn increases dielectric loss to cause difficulties in the production of solid electrolytic capacitors of high quality and reliability. To minimize this problem, the contact region between the anode wire and the electroless-plate layer should as large as possible, making it difficult to reduce the length of the external portion of the anode wire.

Moreover, if the viscosity of the silver paste is increased at the time of coating in order to apply the paste uniformly over the surface, the thickness of the silver paste layer surrounding the anode lead wire is much larger than that at the peripheral region. The length of portion of the the anode lead wire implanted within the coated anode electrode layer is also then larger than necessary. The contour of the anode coated terminal becomes conical compared to the relatively flatly contoured cathode terminal as a result. Such a large difference in the contours of the electrodes induces a so called Tomb-stone phenomena or Manhattan phenomena during the reflow-soldering process to mount the chip-type capacitor on a printed wire board.

SUMMARY OF THE INVENTION

An object of this invention is to provide a chip-type solid electrolytic capacitor which can be further reduced in size from the conventional simplified resin coating type chip solid electrolytic capacitor and which is higher in quality than the prior art. A further objective is to provide a manufacturing method for such a chip-type solid electrolytic capacitor.

This invention is characterized in that a conventional silver paste layer as an underlying layer for an electroless-plated layer is deleted. Instead, metal catalyst particles are provided on the insulating resin layer surface and on the anode lead wire. The particles are provided so dispersedly as not to form an electrical conductive layer. Forming the electroless-plated layer includes a step of fixing a metal catalyst on the insulating resin dispersedly after roughening the surface. As this structure eliminates the possibility of causing defective electric contact due to temperature changes, the capacitor can be formed with a higher quality. Moreover, because the silver paste, which is the main reason for increased thickness of the conventional anode coated electrode, is deleted, the thickness of the anode coated terminal of the present invention can be remarkably reduced. This in turn makes it possible to form the contour of the anode coated terminal substantially the same as that of the cathode coated electrode to thereby inhibit the Tomb-stone phenomenon.

DESCRIPTION OF THE PREFERRED EMBODIMENTS

Figure 1:
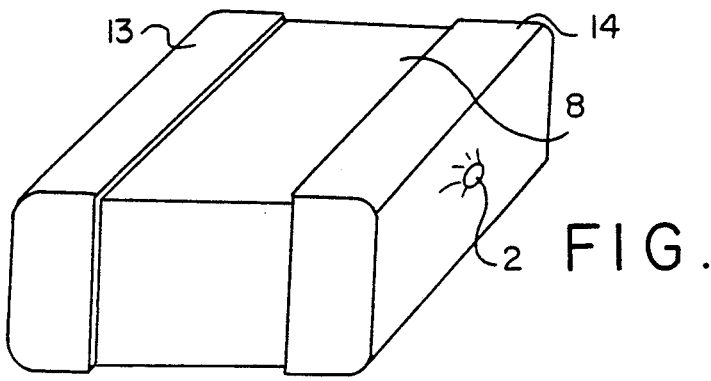
FIG. 1 is a perspective view showing a first embodiment of the chip type solid electrolytic capacitor according to this invention.
Figure 2:
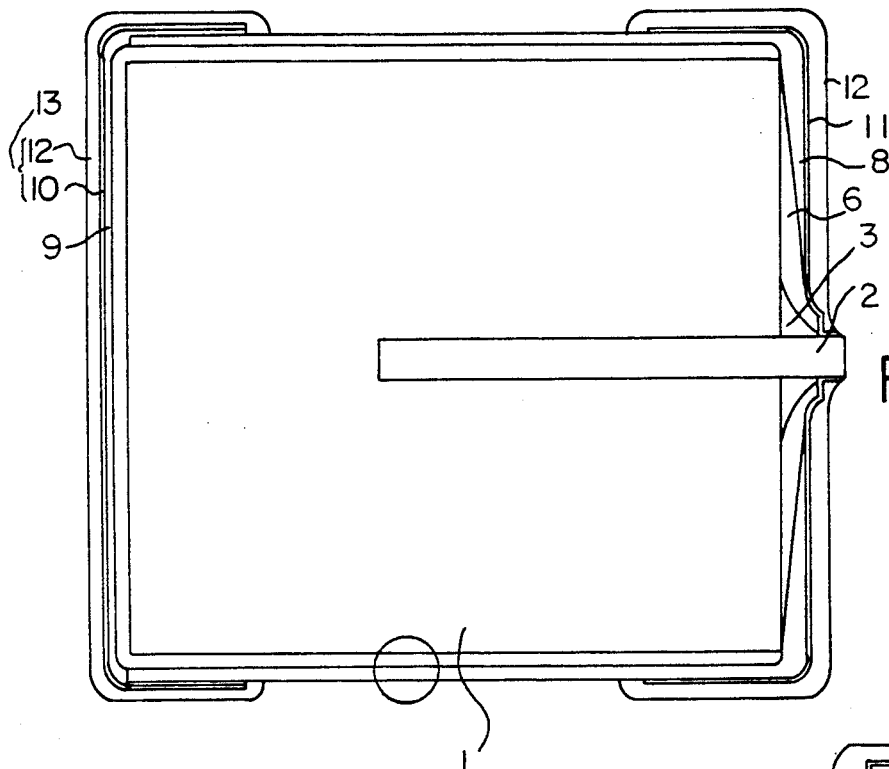
FIG. 2 is an enlarged sectional view of FIG. 1
Figure 2A:
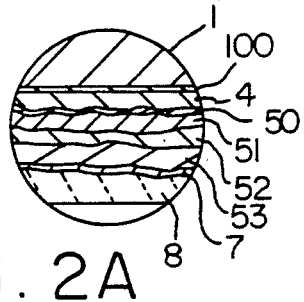
FIG. 2A is an enlarged view of the circled portion of FIG. 2

Referring to FIG. 1 and FIG. 2, and 2A an anode body 1 is made by pressure-molding and vacuum sintering a valve-metal powder such as tantalum powder. An anode wire 2 of tantalum material is implanted into the anode body 1. A water-repellent insulating coat 3 is provided at an exposed portion of the anode wire 2. The anode body 1 is coated with an oxidized dielectric layer 100 and a solid electrolyte layer or a semiconductor oxidized layer 4. An underlying conductive layer 50 is formed on the solid electrolyte layer 4 and first and second graphite layers 51 and 52 are formed thereon. A top surface of the anode body 1, where the anode lead is led out, is applied with polybutadiene resin and heated to form a coated resin layer 6. Further a third graphite layer 53 containing a metal catalyst powder such as palladium powder and a first plated layer 7 such as an electroless plated nickel layer are sequentially formed on the second graphite layer 52.

An insulating resin layer 8 is then formed on the resin layer 6 and the first plated layer 7 except for a bottom surface opposing the top surface. A fourth conductive layer 9 containing a metal catalyst powder such as palladium powder is formed on the first plated layer 7 at a region exposed from the insulating layer 8. Upon the fourth conductive layer 9 are formed a second plated layer 10 such as an electroless-plated nickel layer and a solder layer sequentially to form a cathode coated terminal. Upon the insulating resin layer 8 on the top surface of the anode body and the anode wire 2 is formed an anode coated terminal comprising a third plated layer 11 such as an electroless-plated nickel layer and a solder layer 12. Lastly, the anode wire 2 is cut to complete a chip-type solid electrolytic capacitor.

The anode coated terminal according to this invention comprises, in short, two layers; namely a plated layer and a solder layer which are directly formed upon the resin coating layer without using any conductive paste layer.

A typical example of manufacturing process of the chip-type tantalum solid electrolytic capacitor having an outer size of 5.7 mm length, 5.0 mm width and 2.5 mm thickness according to this invention will now be described.

The tantalum powder is pressure-moulded together with an anode lead wire 2 implanted therein and vacuum-sintered to form an anode body 1. Water-repellent resin is around the root portion of the anode wire 2 and is heated to form a water-repellent resin layer 3. The anode body 1 is anodized within an aqueous solution of phosphoric acid at a formation voltage of about 40 V to form a dielectric layer of a tantalum oxide film 100 thereon. The thickness of the dielectric layer is about 0.05~0.07 μm. The anode body 1 is then immersed in a solution of manganese nitrate for adhesion of manganese dioxide and pyrolysed in an atmosphere of 200°~250° C. to form a semiconductive oxide layer of manganese dioxide 4. The processes of immersion and pyrolysis are repeated several times in order to fill the small pores of the anode body 1 with manganese dioxide and to obtain a uniform layer of manganese dioxide with a thickness of about 20~80 μm In this process, the water-repellent layer 3 prevents deposition of the solution of manganese nitrate onto the anode wire 2. After the foregoing treatment, the element 1 is then immersed into a mixed aqueous solution of graphite powder and water-soluble resin and dried in an atmosphere of 150°~200° C. to form a graphite layer 50 as an underlying conductive layer. These immersion and drying processes are repeated several times so as to decrease the contact resistance between the manganese dioxide layer 4 and a first graphite layer 51 described hereinafter. The thickness of the underlying graphite layer 50 is about 1~2 μm. Next, the element is immersed into a solution obtained by diluting a conductive paste, which contains graphite powder, epoxy resin and inorganic filler as major components, with organic solvent such as butyl cellosolve. Thereafter, the element is dried in an atmosphere of 150°~200° C. to form a first graphite layer 51 with a thickness of about 20~50 μm. Then, the element is immersed into a solution obtained by diluting a conductive paste, which contains graphite powder and acrylresin as major components, with water and dried in an atmosphere of 150°~200° C. to form a second graphite layer 52 with a thickness of about 30~60 μm.

Then, polybutadiene resin is applied by a dispenser on the top surface of the element where the anode wire 2 is lead out, and the element is dried in an atmosphere of 150°~200° C. to form a coated resin layer 6.

The element is then immersed in a solution which is obtained by mixing 3~15 wt% of epoxy resin, 10~20 wt% of graphite powder, 2~6 wt% of inorganic filler and 30~60 wt% of copper powder to form a conductive paste and diluting it with an organic solvent such as butyl cellosolve, up to the position to contact the coated resin layer 6 and thermally set in an atmosphere of 150°~200° C. to form a third conductive layer 53 with a thickness of about 20~50 μm. The copper powder within the third conductive layer has a diameter of about 0.5 μm and is effective as catalyst for electroless plating. The inorganic filler enhances adhesion to an electroless plated layer 7 described hereinafter due to the irregularities formed on the surface by an anchor effect.

The element is further immersed for 1~2 minutes in hydrochloric of about 3.5%, and then washed with pure water, and electroless-plated. Since the top surface of the element is covered with the coated resin layer 6, the graphite layers 51 and 52 and the manganese dioxide layer 4 and oxide film 100 are protected from gas at the time of electroless plating reaction. The plating solution may be an electroless nickel plating solution (pH=6~7 at room temperature) using dimethylaminoborane as reducing agent. The plating is conducted for 30~40 minutes at 60°~65° C. to form about 5 μm thickness of a nickel plated layer 7. Upon completion of plating, the element is fully washed with water and left standing in a thermostat bath at 120°~150° C. to vaporize moisture. A mask is then placed on the bottom surface of the element opposite the anode wire 2. Powder epoxy resin is electro-statically coated on the outer surface of the element and calcined in an atmosphere of 100°~200° C. for about 30 seconds after removing the mask, the resin is heated for 30~60 minutes at an atmosphere at 100°~200° C. and fully hardened to form an insulating resin layer 8 with a thickness of about 100 μm. Alumina powder having at average grain size of about 40~50 μm is then sprayed on the exposed anode wire 2, the top surface region of the resin layer 8, and part of the side portion thereof adjacent to the shoulder region to remove the oxide film from the surface and to roughen the same.

A butyl acetate solution of an amino compound of palladium is applied to the roughened region of the insulating resin layer 8 and the anode wire 2 absorbing with a sponge absorbing and pyrolysed in a 180°~200° C. atmosphere to adhere the palladium. The reason for roughening the surface is to enhance the contact strength between the resin layer 8 and an electroless-plated layer to be formed thereon. The palladium powder is applied dispersedly such that the under layer is exposed. When the diameter of the paradium powder is about 0.01 μm, about 0.3 μg/cm$^2$ (about $4 \times 10^{10}$ particles/cm$^2$) of paradium powder is adhered. Thus, the adhesive power between the electroless-plated layer and the under layer will not be minimized. In view of the adhesive power, the amount of palladium powder should be reduced so as not to form a conductive layer of the paradium. A conductive paste of the same material used for the third conductive layer 53 is coated on the first electroless plated layer 7 exposed from the resin layer 8 and a part of the side surface of the resin layer 8. After removing a recess paste by applying a sheet thereto, the element is thermally set in an atmosphere at 150°~200° C. to form a fourth conductive layer 9 with a thickness of about 20~100 μm.

The element is then immersed in the above-mentioned electroless-nickel plating solution at 60°~65° C. for 30~40 minutes up to the position to contact the anode wire 2 to form an electroless-plated nickel layer 10 on the fourth conductive layer 9, and an electroless-plated nickel layer 11 on the exposed anode wire 2 and resin layer 8 where palladium has been adhered, respectively. The electroless-plated nickel is not precipitated on the remaining part of the insulating resin layer 8 because that part has no plating catalyst particles.

The element is further immersed in a flux, and then bathed in a silver-added soldering bath having a solid phase line of 280°~310° C. at bath temperature of 300°~350° C. Next, the element is bathed in an eutectic soldering bath at 230°~280° C. to form soldering layers 12 on the second and third plated layers to complete an anode terminal 14 and a cathode terminal 13.

Finally, an excessive length of the anode wire 2 is cut by laser beam to form a chip type solid electrolytic capacitor.

Although polybutadiene resin is used in this embodiment as the material for coated resin layers to be formed on the anode wire implanted surface, the material may be other resins such as epoxy, acryl, polyester, polyvinyl chloride, polypropylene or a mixture thereof, as long as the material can protect the oxidized films or the layer of manganese dioxide from gas such as hydrogen generated at the time of the electroless plating reaction.

Figure 3:
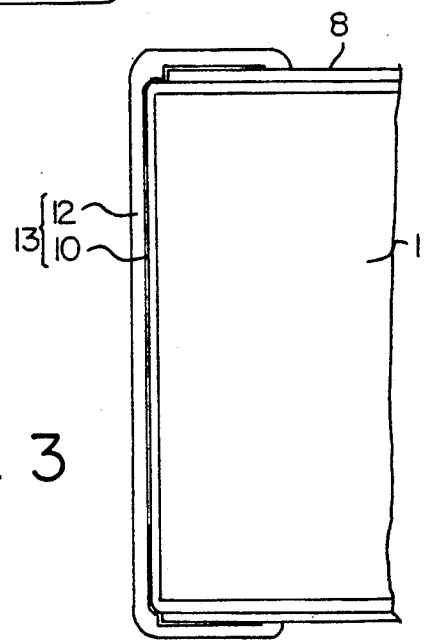
FIG. 3 is a second view showing a portion of a cathode terminal according to a second embodiment of the chip type solid electrolytic capacitor of this invention.

FIG. 3 shows a vertical section of another embodiment of this invention which is different from the first embodiment in that while the first embodiment pyrolysed an organic compound of a metal catalyst for forming an anode terminal and then conducted electroless-nickel plating alone, the same method is reused for forming a cathode terminal in the second embodiment. More specifically, after having formed an insulating resin layer 8, a butyl acetate solution of an amine compound of palladium is applied on a roughened surface of the anode wire, the top surface of the resin layer 8 and the bottom surface exposed from the resin layer 8 in the same manner of the first embodiment. The solution is then pyrolysed at 180°~200° C. for about 30 minutes to adhere the palladium thereon. The device is immersed in the aforementioned electroless nickel plating solution at 60°~65° C. for 30~40 minutes up to the position to contact the anode wire 2 to form an electroless-plated nickel layer or the second plated layer 10 and the third plated layer 11.

As this embodiment does not use the fourth conductive layer 9 which was used for the first embodiment, the thickness of the cathode terminal 13 can be reduced by about 20~100 μm to further minimize the size of the chip type solid electrolytic capacitor. This reduced the manufacturing cost.

As stated in the foregoing, this invention is quite effective in minimizing the size of a chip-type solid electrolytic capacitor, enhancing the volumetric efficiency as well as the reliability of the device, and inhibiting the Tomb-stone phenomenon in use. By forming a plated layer and soldering layer directly onto the insulating resin layer without employing conductive paste when forming anode terminal, the thickness of the anode terminal can be greatly reduced.

What is claimed is:

1. A chip-type solid electrolytic capacitor comprising a capacitor element having a first surface, a second surface opposed to said first surface, and a third surface extending between said first surface and said second surface, an anode lead wire extending outwardly from said first surface, a cathode layer formed on said second surface and said third surface, an insulating layer coated on said first surface and said third surface, a first electroless plated layer directly formed onto said insulating layer at a region located on said first surface so as to be electrically connected to said anode lead wire, a first solder layer formed onto said electroless plated layer, a second electroless plated layer formed on said cathode layer, and a second solder layer formed onto said second electroless plated layer.

2. A chip-type solid electrolytic capacitor as claimed in claim 1, wherein the surface of said insulating layer contacting said electroless plated layer is roughened and provided with electroless-plated catalyst particles.

3. A chip-type solid electrolytic capacitor as claimed in claim 2, wherein said electroless-plated catalyst particles include palladuim powder.

4. A chip-type solid electrolytic capacitor as claimed in claim 1, wherein the outer shape of said first solder layer has substantially the same outer shape as said second solder layer.

5. A solid electrolyte capacitor comprising: an anode body of valve-metal, an anode wire extending from one surface of said anode body, a dielectric layer formed on said anode body, a solid electrolyte layer formed on said dielectric layer, a conductive layer formed on said solid electrolyte layer, an insulating resin coating formed on said conductive layer except for a region opposing said one surface of said anode body, a powder of a plating catalyst formed dispersedly on said insulating layer at a region of said one surface of said anode body and on a portion of said anode wire extending from said insulating layer, an electroless-plated layer formed on said insulating layer and said anode wire by the function of said plating catalyst powder, a first solder layer formed on said electroless-plated layer, a second powder of a plating catalyst provided on said first conductive layer exposed from said insulating layer and on a peripheral end of said insulating layer, a second electroless-plated layer formed on a region provided with said second powder of said plating catalyst, and a second solder layer formed on said second electroless-plated layer.

6. A solid electrolyte capacitor comprising: an anode body of valve-metal, an anode wire extending from one surface of said anode body, a water-repellent insulating coat provided at an exposed portion of said anode wire, a dielectric layer formed on said anode body, a solid electrolyte layer formed on said dielectric layer, an underlying conductive layer formed on said solid electrolyte layer, a first conductive layer formed on said underlying conductive layer and containing filler, a second conductive layer formed on said first conductive layer, a first insulating resin coating formed on said water-repellent insulating coat, a third conductive layer formed on said second conductive layer and containing filler and a first powder of a plating catalyst, a first electroless-plated layer formed on said third conductive layer, a second insulating resin coating formed on said first insulating resin coating and on said first electroless-plated layer except for a region opposing said one surface of said anode body, a second powder of a plating catalyst formed dispersedly on said second insulating layer at a region of said one surface of said anode body and on a portion of said anode wire extending from said second insulating layer, a second electroless-plated layer formed on said insulating layer and said wire in the vicinity of said second poder of the plating catalyst, a first solder layer formed on said second electroless-plated layer, a fourth conductive layer formed on said first electroless-plated layer in said region opposing said one surface and containing a third powder of a plating catalyst, a third electroless-plated layer formed on said fourth conductive layer, and a second solder layer formed on said third electroless-plated layer.

7. A solid electrolyte capacitor comprising: an anode body of valve-metal, an anode wire extending from one surface of said anode body, a water-repellent insulating coat provided at an exposed portion of said anode wire, a dielectric layer formed on said anode body, a solid electrolyte layer formed on said dielectric layer, an underlying conductive layer formed on said solid electrolyte layer, a first conductive layer formed on said underlying conductive layer and containing filler, a second conductive layer formed on said first conductive layer, a first insulating resin coating formed on said water-repellent insulating coat, a third conductive layer formed on said second conductive layer and containing filler and a first powder of a plating catalyst, a first electroless-plated layer formed on said third conductive layer, a second insulating resin coating formed on said first insulating resin coating and on said first electroless-plated layer except for a region opposing said one surface of said anode body, a second powder of a plating catalyst formed dispersedly on said second insulating layer at a region of said one surface of said anode body and on a portion of said anode wire extending from said second insulating layer, a second electroless-plated layer formed on said second insulating layer and said wire in the vicinity of said second powder of the plating catalist, a first solder layer formed on said second electroless-plated layer, a third powder of a plating catalyst formed dispersedly on said first electroless-plated layer in said region opposing said one surface, a third electroless-plated layer formed on said first electroless-plated layer in the vicinity of said third powder of the plating catalyst, and a second solder layer formed on said third electroless-plated layer.

8. A method for manufacturing a chip-type solid electrolytic capacitor comprising the steps of: forming an insulating resin layer on a surface of a capacitor element except for one end surface to expose a cathode layer thereof, providing a metal catalyst on a surface of said insulating resin layer at a region opposing said one end surface and on a surface of an anode lead wire which extends from said insulating resin layer, forming a first electroless plated layer on said insulating resin layer and said anode lead wire by utilizing the catalyst function of said powder, forming a first solder layer on said first electroless-plated layer, forming a second electroless-plated layer on said cathode layer, and forming a second solder layer on said second electroless-plated layer.

9. A method for manufacturing a chip-type solid electrolytic capacitor as claimed in claim 8, wherein said step of forming a first electroless plated layer further comprises roughening the surface of said insulating resin layer and said anode lead wire whereto said electroless plated layer is to be formed, and providing a metal catalyst powder on said roughened surfaces of said insulating resin layer and anode lead wire prior to said forming said first electroless plated layer.

10. A method for manufacturing a chip-type solid electrolytic capacitor as claimed in claim 9, wherein said step of providing a metal catalyst powder comprises applying an organic compound solution of palladium powder on said roughened surfaces and pyrolyzing said powder of palladium to adhere said palladium dispersedly on said roughened surfaces.

* * * * *